United States Patent [19]

Zajicek et al.

[11] Patent Number: 4,841,542
[45] Date of Patent: Jun. 20, 1989

[54] ELECTRIC FURNACE ARRANGEMENT

[75] Inventors: Ernst Zajicek, Ottensheim; Ernst Riegler, Enns; Johann Mühlbauer, Leonding, all of Austria

[73] Assignee: Voest-Alpine Aktiengesellschaft, Linz, Austria

[21] Appl. No.: 193,735

[22] Filed: May 12, 1988

[30] Foreign Application Priority Data

May 15, 1987 [AT] Austria ................. 1233/87

[51] Int. Cl.⁴ ............................. H05B 7/02
[52] U.S. Cl. ........................ 373/73; 373/81
[58] Field of Search ............... 373/74, 84, 81, 73, 373/79

[56] References Cited

U.S. PATENT DOCUMENTS 1,818,239  8/1931  Moore ................... 373/81
2,529,319  11/1950  Thys .................... 373/84

Primary Examiner—Roy N. Envall, Jr.
Attorney, Agent, or Firm—Hopgood, Calimafde, Kalil, Blaustein & Judlowe

[57] ABSTRACT

An electric furnace includes a furnace vessel arranged on a furnace platform and covered by a furnace lid liftable and lowerable by a lid lifting mechanism and pivotable from a position above the furnace vessel into a position lateral of the furnace vessel, and back, by a lid pivoting mechanism. A lid supporting framework pivotably mounted lateral of the furnace vessel and including at least one lid bracket is provided for lifting, lowering and pivoting the furnace lid. In order that the high-current cables are only slightly twisted when pivoting the furnace lid, despite the pivot axis for the furnace lid being arranged as close to the furnace vessel as possible, the lid supporting framework is pivotably connected with the furnace platform by an oscillating crank hinged to it. The lid supporting framework, under formation of a coupler, either is hinged to the furnace platform by means of a further oscillating crank under formation of a four-bar linkage or is guided with by one point along a guide arranged on the furnace platform under formation of a thrust crank.

14 Claims, 3 Drawing Sheets

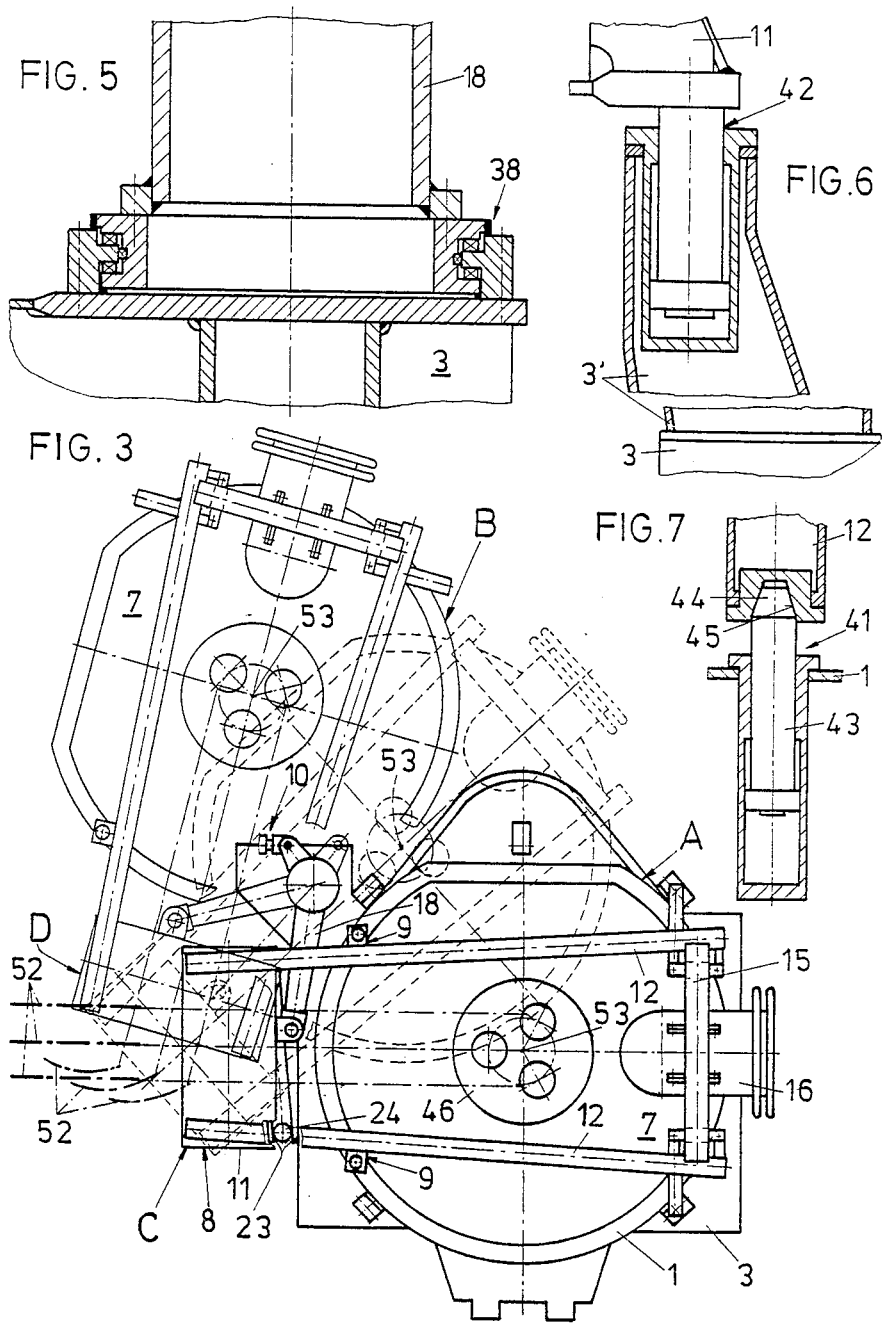

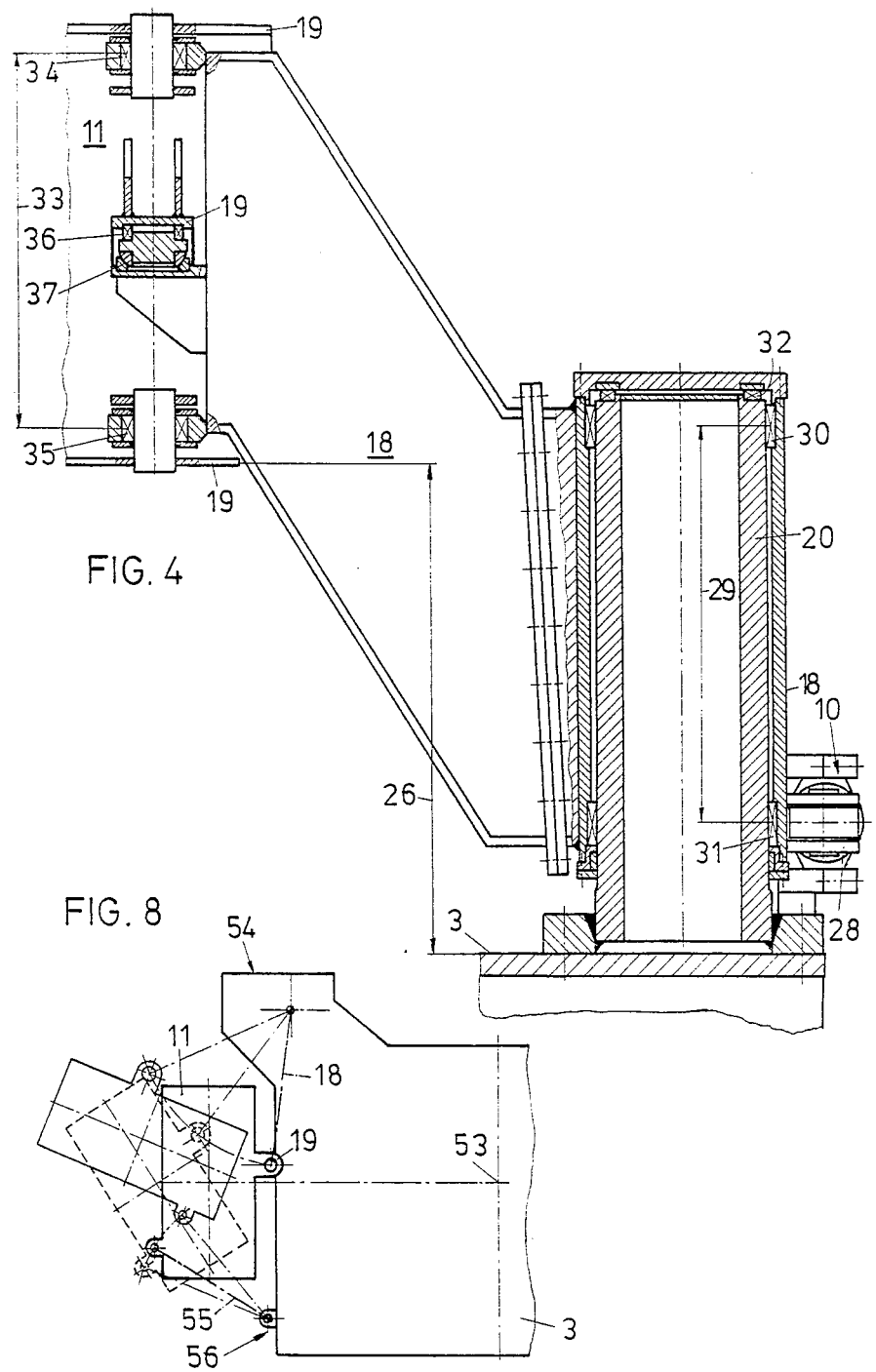

ELECTRIC FURNACE ARRANGEMENT

The invention relates to an electric furnace, such as an electric arc furnace or a plasma furnace, comprising a furnace vessel arranged on a furnace platform and covered by a furnace lid liftable and lowerable by a lid lifting mechanism. The furnace lid is pivotable by means of a lid pivoting mechanism from a position above the furnace vessel into a position lateral of the furnace vessel and back. The lifting and pivoting of the lid is achieved by a supporting framework pivotably mounted lateral of the furnace vessel. The supporting framework includes at least one lid bracket for lifting, lowering and pivoting the furnace.

An electric furnace of this type is known from DE-C - 35 22 559 and from DE-B - 1 216 900. With these furnaces, the lid is each pivotable about a column disposed lateral of the furnace and on which the lid supporting framework is mounted. With this known structure, this column lies close to the furnace vessel. However, it is that disposition which involves the disadvantage of the lid having to be pivoted by a very large angle if the furnace vessel is to be set free completely, e.g., for the purpose of charging. The high-current cables leading to the electrodes thereby are exposed to an intensive torsional stress, their service lives thus being shortened.

With the known furnaces, the column carrying the lid supporting framework is arranged to be offset from the furnace towards the transformer in order to keep as short as possible the high-current tracks or the length of the current path from the transformed to the electrode. This involves disadvantages, such as a relatively large path of travel of the center of gravity of the lid during pivoting of the lid. Thus, with a furnace having a rocking frame, the introduction of lid forces the rocking frame during lifting and pivoting of the lid is such that the rocking frame has to be specially reinforced on the site of force introduction. This generally requires a rocking frame having a large mass.

The invention aims at eliminating these disadvantages and difficulties and has as its object to provide an electric furnace of the initially defined kind, with which the high-current cables are only slightly twisted when pivoting the furnace lid, despite the fact that the pivot axis for the furnace lid is arranged as close to the furnace vessel as possible. In addition, the center of gravity of the lid system, that is the supporting framework, should cover a path as short as possible when the lid is pivoted, with the distance of the center of gravity from the site of introduction of the tilting and vertical forces into the furnace platform having to be kept as short as possible.

It is a further object of the invention to be able, with a furnace having a rocking frame, to arrange the site of transmittance fo the tilting and vertical forces into the furnace platform or into the rocking frame at a location of the furnace platform or of the rocking frame, respectively, at which the furnace platform or the rocking frame has been reinforced from the very beginning. Thereby, a structurally simple and, above all, more lightweight construction of the rocking frame is desirable.

In accordance with the invention, these objects are achieved in that the lid supporting framework is pivotably connected with the furnace platform by an oscillating crank hinged to it, and that, furthermore, the lid supporting framework is hinged by means of a coupler either to the furnace platform by means of a further oscillating crank in the form of a four-bar linkage system or is guided by one point along a guiding means arranged on the furnace platform using of a thrust crank.

A pivot drive means that is particularly simple in terms of construction advantageously is realized by actuating one of the oscillating cranks or the oscillating crank by means of a pivot drive.

Suitably, the hinge site of at least one oscillating crank to the furnace platform is designed as a column absorbing the tilting forces and vertical forces created by the lid supporting framework and the furnace lid.

According to a particularly space-saving mode of construction, the hinge site of the oscillating crank to the furnace platform suitably is designed as a roller rotating connection absorbing tilting forces and vertical forces.

According to another embodiment, which is particularly sturdy and rigid, the hinge site of the oscillating crank to the lid supporting framework comprises two vertically spaced-apart radial bearings absorbing tilting forces and at least one thrust bearing provided in alignment with the radial bearings to absorb vertical forces.

Preferably, the furnace platform is designed as an approximately rectangular rocking frame with the hinge point(s) of the oscillating crank(s) being provided at one corner, or at neighboring corners, of the rocking frame. A particular advantage of this construction is to be seen in that the rocking frame, which has been designed to be particularly rigid in its corners from the very beginning, does not require any expensive reinforcement of the rocking frame for the force introduction of the forces derived from the lid and the lid supporting framework.

Preferably, the lid supporting framework is mounted so as to be immovable in the vertical direction relative to the furnace platform, the lid lifting mechanism being arranged between the lid carrying arm and the furnace lid. Thereby, lifting and lowering movements of the lid supporting framework can be avoided such that the lid supporting framework may be built in a particularly simple and sturdy manner.

According to a preferred variant, when employing a thrust crank, the guide is designed straight, extending approximately tangentially to the side of the furnace vessel neighboring the lid supporting framework.

In this case, the lid supporting framework suitably comprises a supporting framework box to which at least one lid bracket is fastened, wherein, on the supporting framework box, an arm cantilevering in the direction towards the furnace vessel is arranged on which the hinge site for the hinge connection of the oscillating crank is provided, and a guiding arm is fastened to whose free cantilevering end a catch means, preferably a roller, is mounted so as to engage the guide, the guide being arranged approximately at the level of the furnace platform and the supporting framework box being arranged thereabove. Thereby, it is possible to keep the supporting framework box free of the driving parts in order to let the electrode lifting mechanism pass through the box, the guiding rollers for the electrode lifting mechanism, thus, being freely accessible both on the upper and on the lower sides of the supporting framework box.

In order to avoid oscillations of the lid supporting framework, which may be induced by electric arc forces and by electrode movements, at least one actuation unit advantageously is provided between the lid supporting framework and the furnace vessel and/or the furnace platform to support the lid supporting framework, this actuation unit suitably being designed as a centering element.

The invention will now be explained in more detail by way of two embodiments with reference to the accompanying drawings, wherein:

FIG. 3 shows the pivoting of the furnace lid in different positions in an illustration analogous to FIG. 2;

FIG. 4 represents an enlarged partially sectioned detailed view according to the arrow IV of FIG. 2;

FIG. 5 represents a variant in a sectioned view analogous to FIG. 4;

FIGS. 6 and 7 illustrate details sectioned according to lines VI—VI and VII—VII of FIG. 2;

FIG. 8 represents a second embodiment of an electric furnace according to the invention in an illustration analogous to FIG. 2, yet just schematically.

Figure 1:
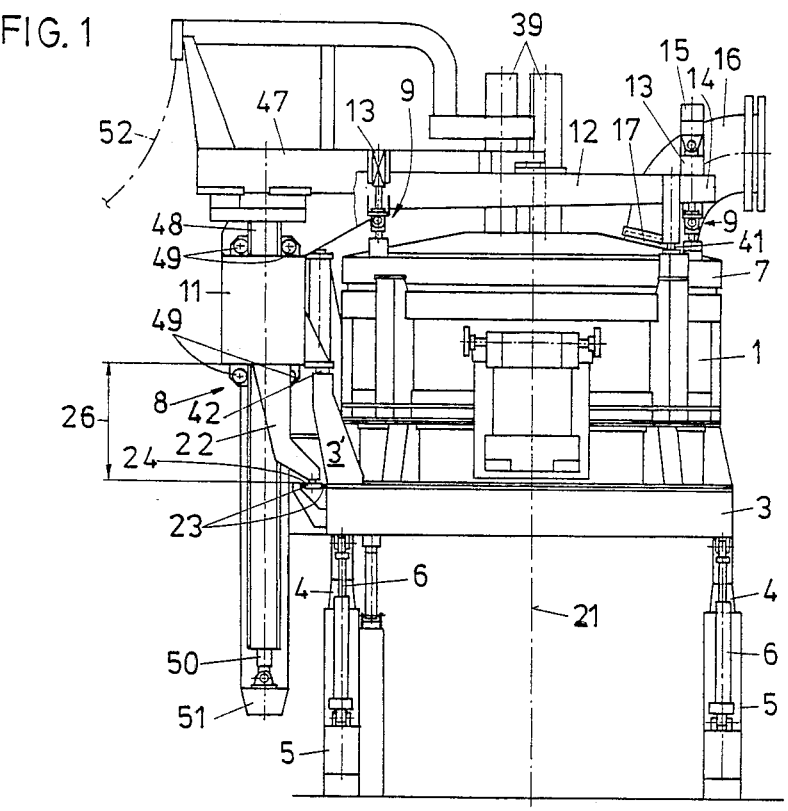
FIG. 1 is a side view of an electric furnace according to one embodiment.

A furnace vessel 1 of an electric arc furnace with an eccentric bottom tap 2 rests on a rocking frame 3 mounted on antifriction tracks 4 provided on the upper end of concrete cheeks 5 arranged on the base. Pressure medium cylinders 6 arranged on the concrete cheeks 5 on the one hand, and on the rocking frame 3 on the other hand, serve to tilt the furnace vessel 1.

During operation of the furnace, the furnace vessel 1 is covered by a water-cooled furnace lid 7. This furnace lid 7 is liftable and lowerable by means of a lid supporting framework 8 and also is pivotable. The lid supporting framework 8 is equipped with a lid lifting mechanism 9 for lifting and lowering the furnace lid 7, and a lid pivoting mechanism 10 is provided for pivoting the furnace lid 7 from an operating position A above the furnace vessel 1 into a charging position B lateral of the furnace vessel 1, and back.

The lid supporting framework 8 comprises a supporting framework box 11, to the upper side of which two lid brackets 12 are fastened, reaching over the furnace lid 7. Between the lid brackets 12 and the furnace lid 7, lifting cylinders 13 are arranged on four placement or spots, forming the lid lifting mechanism 9. A fumes bend or conduit 16, which extends upwardly from exhaust opening 17 of the furnace lid 7, is supported on the cantilevering ends 14 of the lid brackets 12 by means of a transverse beam 15.

Figure 2:
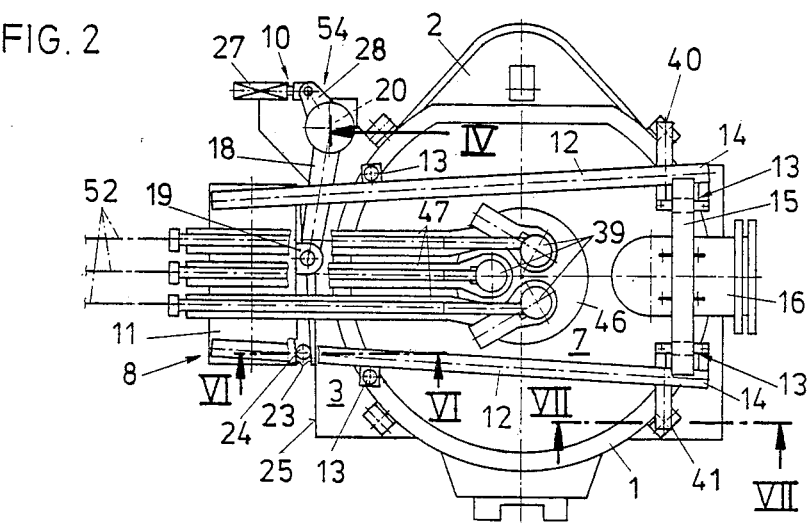
FIG. 2 is a top view on this electric furnace.

According to the embodiment represented in FIGS. 1 and 2, the supporting framework box 11 is designed as the coupler of a thrust crank whose oscillating crank 18, with one end, is hinged to an arm 19 cantilevering on the supporting framework box 11 in the direction towards the furnace vessel 1, and with its other end, is pivotably mounted on a column 20 rigidly mounted on the rocking frame 3 (note FIG. 4) and directed approximately parallel to the central axis 21 of the furnace. Furthermore, a guiding arm 22 is rigidly fastened to the supporting framework box 11, to whose freely cantilevering end a catch 24 designed, for instance, as a roller, is mounted, engaging in a guide 23 arranged on the rocking frame 3. The guide 23 preferably is designed straight, extending approximately parallel or at an acute angle to that side 25 of the rectangularly designed rocking frame 3 on which the lid supporting framework 8 is arranged. The guide 23 and the catch 24 are located approximately at the level of the rocking frame 3. Since the supporting framework box 11 is arranged above the rocking frame 3, both the guiding arm 22 and the oscillating crank 18 have a vertical extension 26 reaching from the rocking frame 3 as far as to the supporting framework box 11 (note FIG. 4).

To pivot the furnace lid 7, the oscillating crank 18 is pivotable about the column 20 by means of a pressure medium cylinder 27, which pressure medium cylinder 27 engages the rocking frame 3, on the one hand, and a projection 28 of the oscillating crank 18, on the other hand.

The oscillating crank 18 is rotatably mounted on the column 20 via two radial bearings 30, 31 (FIG. 4) arranged at a vertical distance 29 from each other (in the normal position of the electric furnace) as well as a thrust bearing 32 arranged on the upper end of the column 20 so that tilting and vertical forces derived from the furnace lid 7 and from the lid supporting framework 8 will be introduced into the column 20 and, thus, into the rocking frame 3.

The mounting of the oscillating crank 18 on arm 19 which is arranged on the supporting framework box 11 is supported by two radial bearings 34, 35 arranged at a vertical distance 33 from each other to absorb tilting forces as well as by a thrust bearing 36 arranged in alignment with the two radial bearings and between the same to absorb vertical forces. The thrust bearing 36 is supported on the supporting framework box 11 via a spherical bearing 37 (FIG. 4).

Instead of mounting the oscillating crank 18 on the rocking frame 3 by means of a column 20, the oscillating crank could be mounted on the rocking frame also by means of a so-called roller rotating connection 38, as is shown in FIG. 5.

In order to avoid oscillations of the lid supporting framework 8, which may be caused by electric arc forces or by movements of the electrodes 39, two hydraulically operated actuation units 40, 41 are provided between the lid brackets 12 and the furnace vessel 1 to support the lid carrying arms 12 on the furnace vessel 1, and a further actuation unit 42 is provided between the rocking frame 3, i.e., between a console 3' fastened to the rocking frame 3, and the supporting framework box 11 (FIG. 6). An actuation unit 41 arranged between the furnace lid 7 and a lid bracket 12 is designed as a centering element, which is illustrated in FIG. 7, and serves to precisely fix the lid brackets 12 relative to the furnace vessel 1. A hydraulically actuatable piston 43 has a conical head 44 to be inserted into a corresponding conical recess 45 provided on the lid bracket 12.

The electrodes 39 which pass through the lid core 46 provided in the center of the furnace lid 7 are retained by electrode brackets 47 which extend from the electrodes 39 towards the supporting framework box 11 and passing through the supporting framework box 11 with vertical standards 48. Guiding rollers 49 are arranged on the upper and lower sides of the supporting framework box 11 to guide these standards 48. Lifting and lowering of the electrodes 39 is effected by means of pressure medium cylinders 50 arranged within vertical standards 48 and engaging, with their outwardly projecting ends, a downwardly directed U-shaped strap 51 annexed to the supporting framework box 11.

The functioning of the electric furnace when pivoting the furnace lid is as follows:

At first, the electrodes 39 are lifted off the furnace vessel 1 or are completely removed from the electric furnace. Then, the lifting cylinders 13 are actuated to lift the furnace lid, the actuation units 40, 41, 42 that fix the furnace lid, the actuation units 40, brackets 12 to prevent oscillations of the lid brackets 12 having been released previously. After having lifted the furnace lid 7 by a predetermined extent, the pressure medium cylinder 27 moving the oscillating crank 18 is actuated, the supporting framework box 11 functioning as a coupler, thus, performing a movement from the starting position C illustrated in FIG. 3 into the pivoted-out position also illustrated in FIG. 3 by thin full lines. During this movement, the catch slides along the guide 23 arranged on the rocking frame 3.

As is apparent from FIG. 3, the supporting framework box performs a slighter angular movement than it would, e.g., when carrying out a pivotal movement about a stationary axle, due to the thrust crank design of the parts moved. Thereby, the high-current cables 52 fastened to the electrode brackets 47 and leading to a transformer arranged nearby (not illustrated in detail) are spared due to the slighter pivotal movement of the same.

In addition, the center of gravity 53 of the furnace lid does not fulfil a circular movement, but a movement that is shortened with respect to a circular movement. The introduction of the tilting and vertical forces ocurring during the lid pivoting procedure is effected exclusively via the oscillating crank 18 into the rocking frame 3. Since the mounting of the oscillating crank 18 is chosen in one corner 54 of the rectangular rocking frame 3 (FIG. 8), the favorable introduction of force into the rocking frame 3 is ensured and the rocking frame, which is designed to be stiffened at its corners, anyway, need not be provided with an additional reinforcement structure.

According to the embodiment illustrated in FIG. 8, the supporting framework box constitutes the coupler of a four-bar linkage, the supporting framework box 11 being hinged to the corners 54, 56 of the rocking frame 3 by means of two oscillating cranks 18 and 55 and the rocking frame 3 constituting the web of the four-bar linkage. Thus, the tilting and vertical forces can be introduced into the rocking frame 3 just via one (18) of the oscillating cranks 18 and 55 or even via both of them.

The invention is not limited to the exemplary embodiments illustrated, but may be modified in various aspects. Thus, the design of the lid supporting framework according to the invention may also be used with plasma furnaces. Moreover, it is possible to use the lid supporting framework with stationary furnaces, i.e., furnaces having a stationary furnace platform, e.g., designed as a pedestal.

What we claim is:

1. In an electric furnace arrangement, such as an electric arc furnace or a plasma furnace, of the type including
   a furnace platform,
   a furnace vessel arranged on said furnace platform,
   a furnace lid covering said furnace vessel,
   a lid supporting framework pivotably mounted lateral of said furnace vessel for lifting, lowering and pivoting said furnace lid and including at least one lid bracket, a lid lifting mechanism for lifting and lowering said furnace lid and a lid pivoting mechanism for pivoting said furnace lid from a position above said furnace vessel into a position lateral of said furnace vessel and back, the improvement comprising oscillating crank means including a first oscillating crank hinged to said lid supporting framework pivotably connecting said lid supporting framework to said furnace platform, and a second oscillating crank provided hinged to said lid supporting framework, said supporting framework constituting a coupler to said furnace platform, thereby forming a four-bar linkage, whereby said four-bar linkage enables the lid-supporting framework to undergo a pivoting and swing motion when removing and returning said furnace lid.

2. In an electric furnace arrangement, such as an electric arc furnace or a plasma furnace, of the type including
   a furnace platform,
   a furnace vessel arranged on said furnace platform,
   a furnace lid covering said furnace vessel,
   a rocking frame supported on said furnace platform,
   a lid supporting framework pivotably mounted lateral of said furnace vessel for lifting, lowering and pivoting said furnace lid and including at least one lid bracket, a lid lifting mechanism for lifting and lowering said furnace lid and a lid pivoting mechanism for pivoting said furnace lid from a position above said furnace vessel into a position lateral of said furnace vessel and back, the improvement comprising oscillating crank means including a first oscillating crank hinged to said lid supporting framework pivotably connecting said lid supporting framework to said furnace platform, and wherein a guide means is arranged on said furnace platform to guide said lid supporting framework, said supporting framework constituting a coupler having cooperably associated therewith a thrust crank coupled to said oscillating crank with one end of said oscillating crank hinged to an arm 19 cantilevered to said supporting framework in the direction towards the furnace vessel and the other end of said oscillating crank pivotally connected to a column rigidly mounted on said rocking frame.

3. An electric furnace arrangement as set forth in claim 1 or 2, further comprising a pivot drive for actuating said oscillating crank means.

4. An electric furnace arrangement as set forth in claim 2, wherein said column constituting the hinge site of said oscillating crank means to said furnace platform is adapted to absorb tilting forces and vertical forces created by said lid supporting framework and said furnace lid.

5. An electric furnace arrangement as set forth in claim 1 or 2, further comprising a roller rotating connection constituting the hinge site of said oscillating crank means to said furnace platform and adapted to absorb tilting forces and vertical forces.

6. An electric furnace arrangement as set forth in claim 1 or 2, further comprising, on the hinge site of said oscillating crank means to said lid supporting framework, two radial bearings arranged at a vertical distance from each other to absorb tilting forces and at least one thrust bearing arranged in alignment with said radial bearings to absorb vertical forces.

7. An electric furnace arrangement as set forth in claim 1 or 2, wherein said furnace platform is designed as an approximately rectangular rocking frame and the hinge point of said oscillating crank means is provided in a corner of said rocking frame.

8. An electric furnace arrangement as set forth in claim 1, wherein said furnace platform is designed as an approximately rectangular rocking frame and the hinge points of said oscillating crank means are provided in neighboring corners of said rocking frame.

9. An electric furnace arrangement as set forth in claim 1 or 2, wherein said lid supporting framework is mounted so as to be immovable in the vertical direction relative to said furnace platform and said lid lifting mechanism is arranged between said lid bracket at least once and said furnace lid.

10. An electric furnace arrangement as set forth in claim 2, wherein said guide means is designed straight, extending approximately tangentially to the side of the furnace vessel neighboring said lid supporting framework.

11. An electric furnace arrangement as set forth in claim 10, further comprising a supporting framework box provided for said lid supporting framework, at least one lid bracket fastened to said supporting framework box so as to project over said furnace lid, an arm arranged on said supporting framework box so as to cantilever towards said furnace vessel and on which the hinge site of said oscillating crank means is provided, a guiding arm fastened to said supporting framework box and having a free cantilevering end, and a catch means mounted on said free cantilevering end of said guiding arm so as to engage in said guide means, said guide means being arranged approximately at the level of said furnace platform and said supporting framework box being arranged thereabove.

12. An electric furnace arrangement as set forth in claim 11, wherein said catch means is designed as a roller.

13. An electric furnace arrangement as set forth in claim 1 or 2, further comprising at least one actuation unit provided between said lid supporting framework and said furnace vessel and/or said furnace platform to support said lid supporting framework.

14. An electric furnace arrangement as set forth in claim 13, wherein said actuation unit is designed as a centering element.

* * * * *

UNITED STATES PATENT AND TRADEMARK OFFICE
CERTIFICATE OF CORRECTION

PATENT NO. : 4,841,542

DATED : June 20, 1989

INVENTOR(S) : Ernst Zajicek et al

It is certified that error appears in the above-identified patent and that said Letters Patent is hereby corrected as shown below:

Column 7, claim 9, line 7, before "lid bracket"

insert -- at least one -- ; and lines 7 and 8, delete

"at least once".

Signed and Sealed this

Twentieth Day of March, 1990

Attest:

JEFFREY M. SAMUELS

Attesting Officer

Acting Commissioner of Patents and Trademarks